United States Patent [19]
Childs et al.

[11] Patent Number: 5,655,328
[45] Date of Patent: Aug. 12, 1997

[54] FISHING ROD HANDLE HEATER APPARATUS

[76] Inventors: James S. Childs, 19 Jackson Ave., Washington, N.J. 07882; Charles M. McLynden, 26 MacKenzie Rd., Hampton, N.J. 08827

[21] Appl. No.: 522,709

[22] Filed: Sep. 1, 1995

[51] Int. Cl.⁶ ............................................. A01K 97/00
[52] U.S. Cl. ....................... 43/25; 43/23; 219/535; 219/549
[58] Field of Search ................. 43/25, 23; 219/528, 219/529, 535, 521, 536, 549, 204

[56] References Cited

U.S. PATENT DOCUMENTS

| | | | |
|---|---|---|---|
| 2,997,042 | 8/1961 | Mitchell | 43/25 |
| 3,577,974 | 5/1971 | Boldt | 126/208 |
| 3,973,348 | 8/1976 | Shell | 43/23 |
| 4,020,825 | 5/1977 | Fusetti | 126/206 |
| 4,279,255 | 7/1981 | Hoffman | 219/535 |
| 4,471,209 | 9/1984 | Hollander | 219/204 |
| 4,598,192 | 7/1986 | Garrett | 43/23 |
| 4,646,461 | 3/1987 | McLeod | 43/23 |
| 5,175,953 | 1/1993 | Lesnock | 43/24 |

*Primary Examiner*—J. Elpel

[57] ABSTRACT

A fishing rod handle heater apparatus includes a flexible sheet-like housing assembly which includes a first end and a second end. The flexible sheet-like housing assembly includes a lock notch which partially extends from the second end toward the first end. A first connector assembly is attached to the first end of the flexible sheet-like housing assembly. A second connector assembly is attached to the second end of the flexible sheet-like housing assembly. The second connector assembly is complementary to the first connector assembly. An electrical resistance heater assembly is housed within the flexible sheet-like housing assembly. A battery-power assembly is electrically connected to the electrical resistance heater assembly, and a manually-operated switch assembly is supported by the battery-power assembly for controlling flow of electric power from the battery-power assembly to the electrical resistance heater assembly. A wind breaker assembly may be attached to the flexible sheet-like housing assembly. The wind breaker assembly includes a first end, a second end, and a shield portion connected between the first end and the second end and which projects upwardly therefrom. The electrical resistance heater assembly may include a first electrical resistance portion which is housed by the flexible sheet-like housing assembly and a second electrical resistance portion which is housed by the wind breaker assembly.

7 Claims, 3 Drawing Sheets

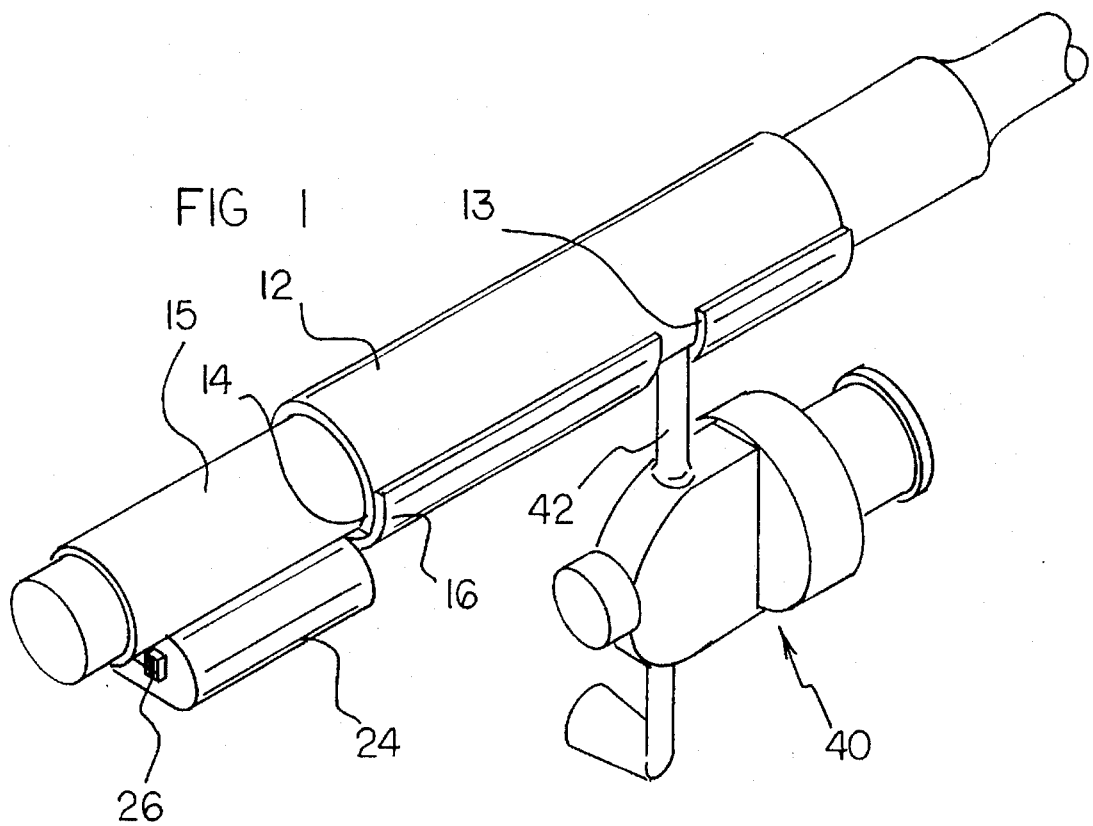
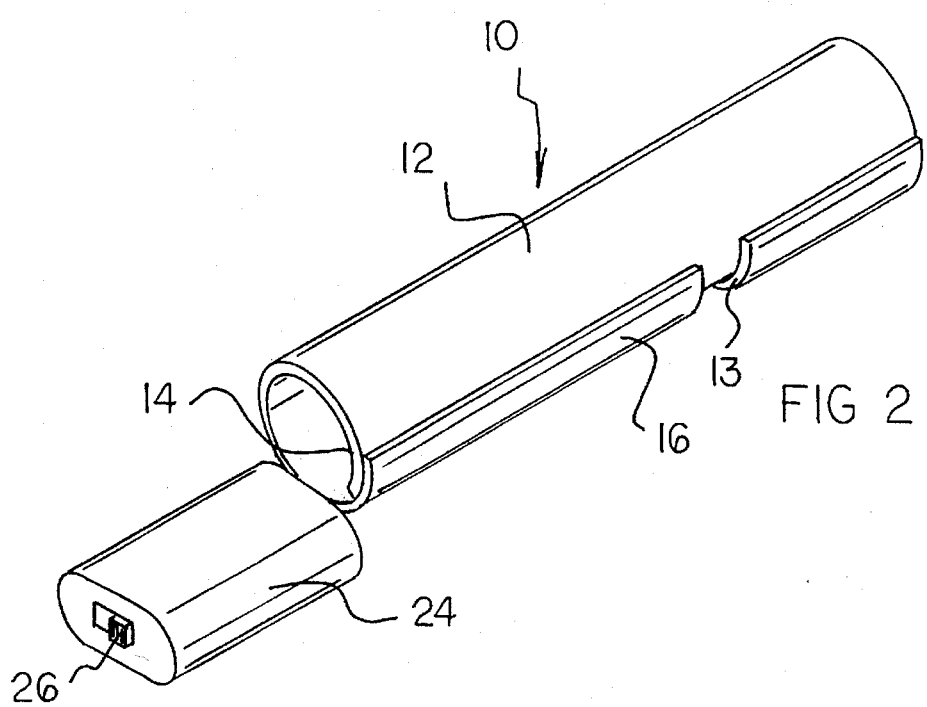

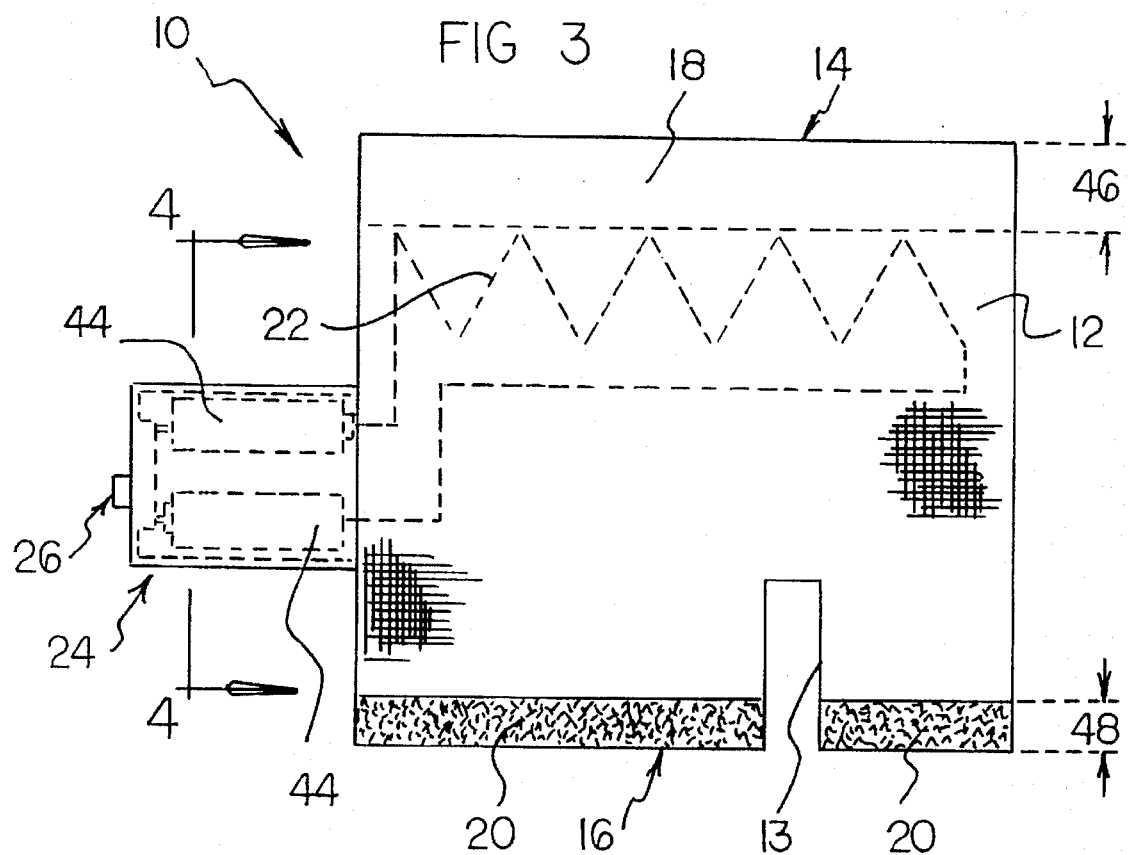
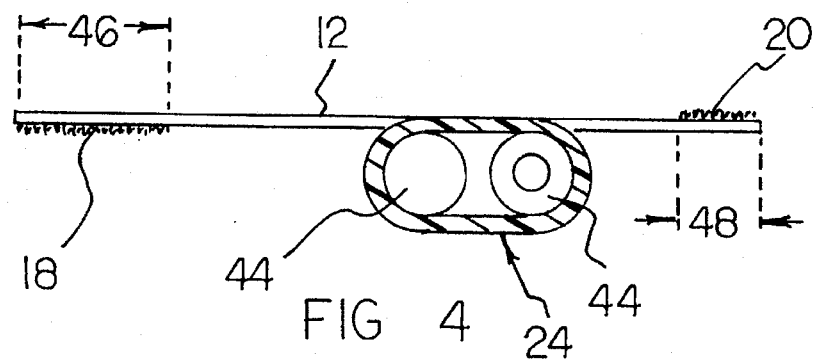

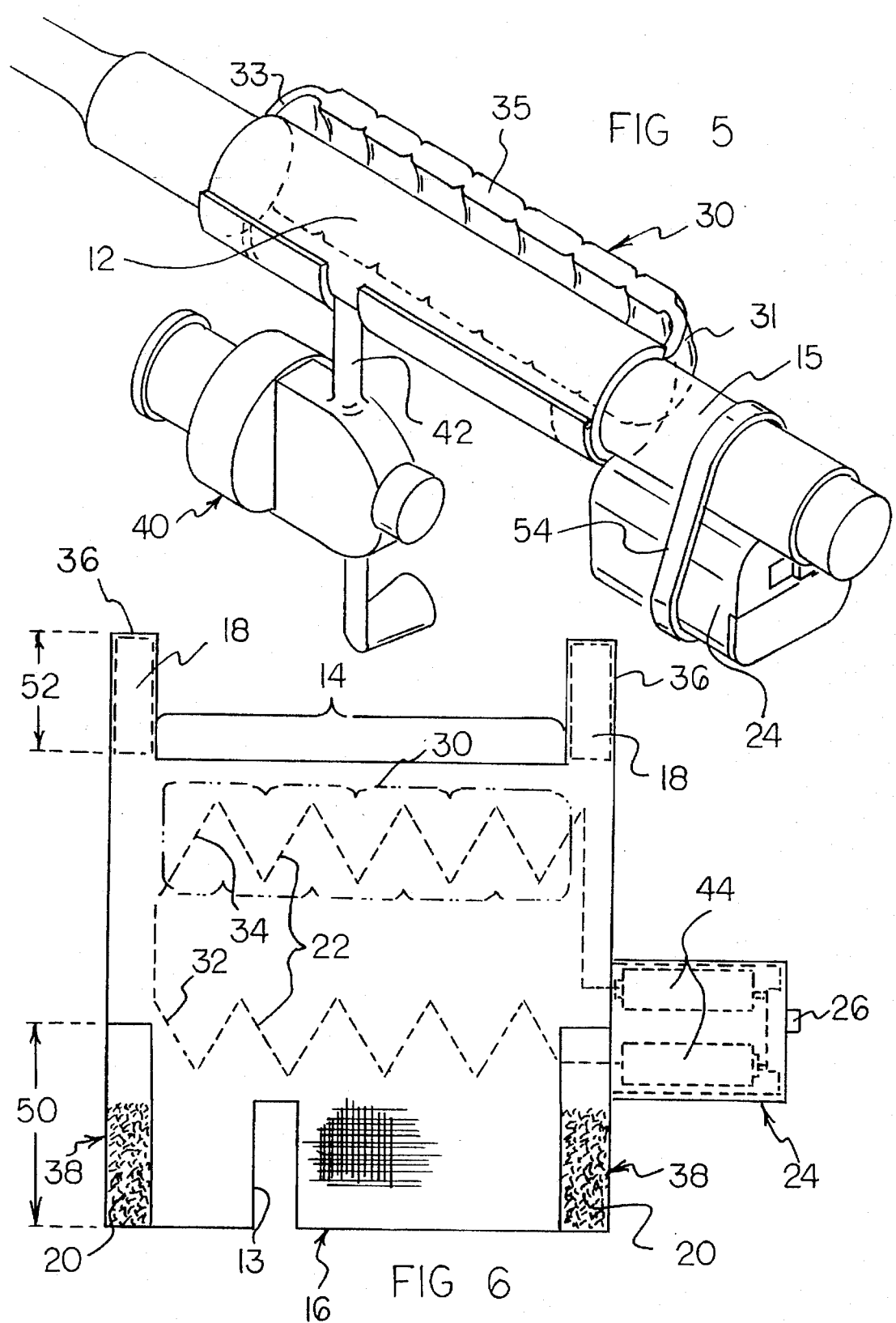

FISHING ROD HANDLE HEATER APPARATUS

BACKGROUND OF THE INVENTION

1. Field of the Invention

The present invention relates generally to heating devices and, more particularly, to heating devices especially adapted for use with handles of fishing rods.

2. Description of the Prior Art

Fisherman who use fishing rods often face conditions in which their hands feel cold. One obvious solution to the problem of cold hands is to wear gloves. However, when a fisherman wears gloves, it may not be easy to apply bait to a hook. Moreover, when wearing gloves, the fisherman may not be as sensitive to small tugs on the fishing line that might be felt if gloves were not worn. Furthermore, while wearing gloves, the fisherman may not be able to operate a reel handle efficiently. Therefore, in view of the above-mentioned problems associated with a fisherman's wearing gloves, it would be desirable if there were a device which provided warmth to a fisherman's hands without the need to wear gloves.

As another type of solution to the hands of fishermen being cold, throughout the years, a number of innovations have been developed relating to heating devices associated with fishing rod handles; and the following U.S. patents are representative of some of those innovations: U.S. Pat. Nos. 3,577,974; 4,020,825; 4,471,209; 4,598,192; 4,646,461; and 5,175,953. More specifically, U.S. Pat. No. 3,577,974 discloses a self-contained handle heater for a fishing pole. The heater is powered by liquified petroleum gas, and the gas supply is supported by the end of the fishing pole handle. Liquified petroleum gas is a very highly energetic fuel. Moreover, a tank for containing liquified petroleum gas must withstand high internal pressures. Therefore, such a tank must be relatively heavy and strong. The added weight of the tank for liquified petroleum gas may be so significant as to bring about premature fatigue for the fisherman. Moreover, the added weight at the end of the fishing pole may significantly upset the balance of forces received by the fishing pole. In view of the above reasons, it would be desirable if an add-on heater for a fishing pole does not include a tank of liquified petroleum gas. Moreover, it would be desirable if an added-on heater for a fishing pole is not added onto the end of the handle of the fishing pole.

Each of U.S. Pat. Nos. 4,020,825, 4,598,192, 4,646,461, and 5,175,953 discloses a hollow fishing rod handle which serves as a housing for portions of a handle heater apparatus. Generally, handles of fishing rods are not hollow and are not adapted to housing portions of a heater apparatus. Such handle heater devices would have to be manufactured into a fishing rod at a factory. Such handle heater devices could not be readily retrofitted onto a conventional handle of a conventional fishing rod. With this in mind, it would be desirable if a heater device for a fishing rod handle were easily retrofitted to a conventional fishing rod handle.

U.S. Pat. No. 4,471,209 discloses electrically heated hand grips for vehicle handle bars. The hand grips are slipped over the ends of the vehicle handle bars. If such electrically heated hand grips were adapted to a handle of a fishing rod, the devices would have to be slipped over the end of the handle of the fishing rod. Such a handle-end location may cause an undesirable alteration in weight distribution over the fishing rod. Moreover, the internal diameter of the hand grips is a constant number. If a fishing rod handle had a smaller diameter than the hand grips, then the hand grips would easily slide off of the handle. Conversely, if the fishing rod handle had a larger diameter than the hand grips, then the hand grips could not be installed on the fishing rod handle. Clearly, such hand grips are not adjustable to wide variety of handle diameters.

Still other features would be desirable in an add-on fishing rod handle heater apparatus. For ease of installation on a wide variety of handles of fishing rods having a wide variety of handle diameters, it would be desirable if a fishing rod handle heater apparatus were in the form of a wrap around jacket that readily attaches to and is readily removed from a fishing rod handle. Moreover, to assure that the fishing rod handle heater apparatus does not inadvertently slide off of the handle, it would be desirable if a mechanical stop device were employed to prevent the fishing rod handle heater apparatus from sliding off of the handle.

Thus, while the foregoing body of prior art indicates it to be well known to use heater devices for fishing rod handles, the prior art described above does not teach or suggest a fishing rod handle heater apparatus which has the following combination of desirable features: (1) provides warmth to a fisherman's hands without the need for the fisherman to wear gloves; (2) does not include a tank of liquified petroleum gas; (3) is not added onto the end of the handle of the fishing rod; (4) is easily retrofitted to a conventional fishing rod handle; (5) is adjustable to a wide variety of handle diameters; (6) is in the form of a wrap around jacket that readily attaches to and is readily removed from a fishing rod handle; and (7) provides a mechanical stop to prevent the fishing rod handle heater apparatus from sliding off of the handle. The foregoing desired characteristics are provided by the unique fishing rod handle heater apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing rod handle heater apparatus which includes a flexible sheet-like housing assembly which includes a first end and a second end. The flexible sheet-like housing assembly includes a lock notch which partially extends from the second end toward the first end. A first connector assembly is attached to the first end of the flexible sheet-like housing assembly. A second connector assembly is attached to the second end of the flexible sheet-like housing assembly. The second connector assembly is complementary to the first connector assembly. An electrical resistance heater assembly is housed within the flexible sheet-like housing assembly. A battery-power assembly is electrically connected to the electrical resistance heater assembly, and manually-operated switch assembly is supported by the battery-power assembly for controlling flow of electric power from the battery-power assembly to the electrical resistance heater assembly. The first connector assembly is comprised of a hook-or-loop connector assembly, and the second connector assembly is comprised of a complementary loop-or-hook connector assembly.

A wind breaker assembly may be attached to the flexible sheet-like housing assembly. The wind breaker assembly includes a first end attached to a first longitudinal end of the flexible sheet-like housing assembly. A second end is attached to a second longitudinal end of the flexible sheet-like housing assembly, and a shield portion is connected between the first end and the second end. The first end and the second end of the wind breaker assembly project upwardly away from the flexible sheet-like housing assembly, such that the shield portion is spaced away from the flexible sheet-like housing assembly.

The electrical resistance heater assembly may include a first electrical resistance portion which is housed by the flexible sheet-like housing assembly and a second electrical resistance portion which is housed by the wind breaker assembly.

The first end of the flexible sheet-like housing assembly may include a pair of tabs each of which includes a first connector assembly. The second end of the flexible sheet-like housing assembly includes a pair of complementary tab-connector regions which are complementary to the pair of tabs.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing rod handle heater apparatus which has all of the advantages of the prior art and none of the disadvantages.

It is another object of the present invention to provide a new and improved fishing rod handle heater apparatus which may be easily and efficiently manufactured and marketed.

It is a further object of the present invention to provide a new and improved fishing rod handle heater apparatus which is of durable and reliable construction.

An even further object of the present invention is to provide a new and improved fishing rod handle heater apparatus which is susceptible of a low cost of manufacture with regard to both materials and labor, and which accordingly is then susceptible of low prices of sale to the consuming public, thereby making such fishing rod handle heater apparatus available to the buying public.

Still yet a further object of the present invention is to provide a new and improved fishing rod handle heater apparatus which provides warmth to a fisherman's hands without the need for the fisherman to wear gloves.

Still another object of the present invention is to provide a new and improved fishing rod handle heater apparatus that does not include a tank of liquified petroleum gas.

Yet another object of the present invention is to provide a new and improved fishing rod handle heater apparatus which is not added onto the end of the handle of the fishing rod.

Even another object of the present invention is to provide a new and improved fishing rod handle heater apparatus that is easily retrofitted to a conventional fishing rod handle.

Still a further object of the present invention is to provide a new and improved fishing rod handle heater apparatus which is adjustable to a wide variety of handle diameters.

Yet another object of the present invention is to provide a new and improved fishing rod handle heater apparatus that is in the form of a wrap around jacket that readily attaches to and is readily removed from a fishing rod handle.

Still another object of the present invention is to provide a new and improved fishing rod handle heater apparatus which provides a mechanical stop to prevent the fishing rod handle heater apparatus from sliding off of the handle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the fishing rod handle heater apparatus of the invention installed on a fishing rod handle.

FIG. 2 is a perspective view of the embodiment of the fishing rod handle heater apparatus shown in FIG. 1 which is removed from the fishing rod handle.

FIG. 3 is a top view of the embodiment of the fishing rod handle heater apparatus of FIG. 2 opened up and flattened out.

FIG. 4 is a cross-sectional view of the embodiment of the invention shown in FIG. 3.

FIG. 5 is a perspective view of a second embodiment of the fishing rod handle heater apparatus of the invention installed on a fishing rod handle.

FIG. 6 is a top view of the embodiment of the fishing rod handle heater apparatus of FIG. 5 opened up and flattened out.

DESCRIPTION OF THE PREFERRED EMBODIMENT

With reference to the drawings, a new and improved fishing rod handle heater apparatus embodying the principles and concepts of the present invention will be described.

Turning to FIGS. 1-4, there is shown a first embodiment of the fishing rod handle heater apparatus of the 's invention generally designated by reference numeral 10. More specifically, the fishing rod handle heater apparatus 10 includes a flexible sheet-like housing assembly 12 which includes a first end 14 and a second end 16. The flexible sheet-like housing assembly 12 includes a lock notch 13 which partially extends from the second end 16 toward the first end 14. A first connector assembly 18 is attached to the first end 14 of the flexible sheet-like housing assembly 12. A second connector assembly 20 is attached to the second end 16 of the flexible sheet-like housing assembly 12. The second connector assembly 20 is complementary to the first connector assembly 18. An electrical resistance heater assembly 22 is housed within the flexible sheet-like housing assembly 12. A battery-power assembly 24 is electrically connected to the electrical resistance heater assembly 22, and manually-operated switch assembly 26 is supported by the battery-power assembly 24 for controlling flow of electric power from the battery-power assembly 24 to the electrical resistance heater assembly 22. The battery-power assembly 24 is supported by either the flexible sheet-like housing assembly 12 or the handle 15 of the fishing rod.

The electrical resistance heater assembly 22 can be made from conventional electrical resistance and insulation materials such are commonly used in flexible electric blankets, heating pads, and the like. The first connector assembly 18 is comprised of a hook-or-loop connector assembly, and the second connector assembly 20 is comprised of a complementary loop-or-hook connector assembly. The first connector assembly 18 and the second connector assembly 20 can be made from complementary VELCRO(™) material.

With further reference to FIGS. 1–4, the first embodiment of the fishing rod handle heater apparatus 10 of the invention is used on a fishing rod that has an attached reel assembly 40. More specifically, the reel assembly 40 is attached to the handle 15 of the fishing rod by of a reel attachment strut 42. To place the fishing rod handle heater apparatus 10 on the handle 15, the open orientation of the fishing rod handle heater apparatus 10 is placed up against the handle 15 so that the lock notch 13 straddles the reel attachment strut 42. Then, the first end 14 of the textile sheet-like housing assembly 12 is rolled around the handle 15 in one direction, and the second end 16 of the flexible sheet-like housing assembly 12 is rolled around the handle 15 in the opposite direction. The flexible sheet-like housing assembly 12 is tightened around the handle 15, and the second VELCRO (™) connector assembly 20 is connected to the first VELCRO(™) connector assembly 18. When the second connector assembly 20 and the first connector assembly 18 are connected to each other, the two connector assemblies prevent the flexible sheet-like housing assembly 12 from unrolling off of the handle 15. Moreover, the engagement of the lock notch 13 with the reel attachment strut 42 prevents the fishing rod handle heater apparatus 10 of the invention from moving longitudinally along the handle 15.

When it is desired to supply heat to the flexible sheet-like housing assembly 12, the manually-operated switch assembly 26 on the battery-power assembly 24 is moved from an "off" to an "on" position. Then, electrical energy stored in batteries 44 flows from the batteries 44 through electrical conductors to the electrical resistance heater assembly 22. The battery-power assembly 24 can be attached to the handle 15 by of a battery-attaching strap 54. The battery-attaching strap 54 can have VELCRO(™) connectors for securing ends of the battery-attaching strap 54 to each other. It is noted that the width 46 of the first connector assembly 18 is greater than the width 48 of the second connector assembly 20. This relationship between the width 46 of the first connector assembly 18 and the width 48 of the second connector assembly 20 permits the flexible sheet-like housing assembly 12 to be wrapped around and installed on a variety of handles having a variety external diameters.

Turning to FIGS. 5 and 6, a second embodiment of the invention is shown. Reference numerals are shown that correspond to like reference numerals that designate like elements shown in the other figures. In addition, a wind breaker assembly 30 is attached to the flexible sheet-like housing assembly 12. The wind breaker assembly 30 includes a first end 31 attached to a first longitudinal end of the flexible sheet-like housing assembly 12. A second end 33 is attached to a second longitudinal end of the flexible sheet-like housing assembly 12, and a shield portion 35 is connected between the first end 31 and the second end 33. The first end 31 and the second end 33 of the wind breaker assembly 30 project upwardly away from the textile sheet-like housing assembly 12, such that the shield portion 35 is spaced away from the flexible sheet-like housing assembly 12. The space between the shield portion 35 and the flexible sheet-like housing assembly 12 permits portions of a fisherman's fingers to be located under the shield portion 35 so that they are protected from blowing wind. The shield portion 35 can be made from expandable cloth mesh.

The electrical resistance heater assembly 22 includes a first electrical resistance portion 32 which is housed by the flexible sheet-like housing assembly 12 and a second electrical resistance portion 34 which is housed by the wind breaker assembly 30. It is noted that the wind breaker assembly 30 need not include a portion of the electrical resistance heater assembly 22, if desired, only the flexible sheet-like housing assembly 12 can be heated.

The first end 14 of the flexible sheet-like housing assembly 12 includes a pair of tabs 36 each of which includes a first connector assembly 18. The second end 16 of the flexible sheet-like housing assembly 12 includes a pair of complementary tab-connector regions 38 which are complementary to the pair of tabs 36. The pair of tabs 36 includes first connector material 18, and the complementary tab-connector regions 38 includes second connector assembly 20. The first and second connector materials can be complementary hook-and-loop and loop-and-hook VELCRO(™) material.

With reference to FIGS. 5 and 6, the second embodiment of the fishing rod handle heater apparatus 10 of the invention is used on a fishing rod that has an attached reel assembly 40, and the reel assembly 40 is attached to the handle 15 of the fishing rod by of a reel attachment strut 42. To place the fishing rod handle heater apparatus 10 on the handle 15, the open orientation of the fishing rod handle heater apparatus 10 is placed up against the handle 15 so that the lock notch 13 straddles the reel attachment strut 42. Then, the first end 14 of the flexible sheet-like housing assembly 12 is rolled around the handle 15 in one direction, and the second end 16 of the flexible sheet-like housing assembly 12 is rolled around the handle 15 in the opposite direction. The flexible sheet-like housing assembly 12 is tightened around the handle 15, and the VELCRO(™) on the complementary tab-connector regions 38 is connected to the VELCRO(™) on the pair of tabs 36. When the pair of tabs 36 and the complementary tab-connector regions 38 are connected to each other, the tabs and tab-connector regions prevent the flexible sheet-like housing assembly 12 from unrolling off of the handle 15. Moreover, the engagement of the lock notch 13 with the reel attachment strut 42 prevents the fishing rod handle heater apparatus 10 of the invention from moving longitudinally along the handle 15.

Once the fishing rod handle heater apparatus 10 is attached to the handle 15, a user can place the wind breaker assembly 30 over portions of the fingers of the user's hand. When it is desired to supply heat to the flexible sheet-like housing assembly 12 and to the wind breaker assembly 30, the manually-operated switch assembly 26 on the battery-power assembly 24 is moved from an "off" to an "on" position. Then, electrical energy stored in batteries 44 flows from the batteries 44 through electrical conductors to the electrical resistance heater assembly 22. It is recalled that the second electrical resistance portion 34 of the electrical resistance heater assembly 22 heats the shield portion 35 of the wind breaker assembly 30, and the first electrical resistance portion 32 of the electrical resistance heater assembly 22 heats the flexible sheet-like housing assembly 12.

It is noted that the lengths 50 of the complementary tab-connector regions 38 are greater than the lengths 52 of the pair of tabs 36. This relationship between the lengths 50 of the complementary tab-connector regions 38 and the lengths 52 of the pair of tabs 36 permits the flexible sheet-like housing assembly 12 to be wrapped around and secured to a variety of handles having a variety external diameters.

The components of the fishing rod handle heater apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing rod handle heater apparatus that is low in cost, relatively simple in design and operation, and which may advantageously be used to provide warmth to a fisherman's hands without the need for the fisherman to wear gloves. With the invention, a fishing rod handle heater apparatus is provided which does not include a tank of liquified petroleum gas. With the invention, a fishing rod handle heater apparatus is provided which is not added onto the end of the handle of the fishing rod. With the invention, a fishing rod handle heater apparatus is provided which is easily retrofitted to a conventional fishing rod handle. With the invention, a fishing rod handle heater apparatus is provided which is adjustable to a wide variety of handle diameters. With the invention, a fishing rod handle heater apparatus is provided which is in the form of a wrap around jacket that readily attaches to and is readily removed from a fishing rod handle. With the invention, a fishing rod handle heater apparatus provides a mechanical stop to prevent the fishing rod handle heater apparatus from sliding off of the handle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A fishing rod handle heater apparatus, comprising:

a flexible sheet housing assembly which includes a first end and a second end, wherein said flexible sheet-like housing assembly includes a lock notch which partially extends from said second end toward said first end sized to receive a portion of a fishing rod reel assembly, a first connector assembly attached to said first end of said flexible sheet housing assembly, a second connector assembly attached to said second end of said flexible sheet housing assembly, wherein said second connector assembly is complementary to said first connector assembly, an electrical resistance heater assembly housed within said flexible sheet housing assembly, and a battery-power assembly electrically connected to said electrical resistance heater assembly, and manually-operated switch assembly supported by said battery-power assembly for controlling flow of electric power from said battery-power assembly to said electrical resistance heater assembly.

2. The apparatus of claim 1 wherein:

said first connector assembly is comprised of a hook-or-loop connector assembly, and said second connector assembly is comprised of a complementary loop-or-hook connector assembly.

3. The apparatus of claim 1, further including:

a wind breaker assembly attached to said flexible sheet housing assembly.

4. The apparatus of claim 3 wherein said wind breaker assembly includes:

a first end attached to a first longitudinal end of said flexible sheet housing assembly, a second end attached to a second longitudinal end of said flexible sheet housing assembly, and a shield portion connected between said first end and said second end.

5. The apparatus of claim 4 wherein said first end and said second end of said wind breaker assembly project upwardly away from said flexible sheet housing assembly, such that said shield portion is spaced away from said flexible sheet housing assembly.

6. The apparatus of claim 4 wherein:

said first end of said flexible sheet housing assembly includes a pair of tabs, each of which includes a first connector assembly, and said second end of said flexible sheet housing assembly includes a pair of complementary tab-connector regions which are complementary to said pair of tabs.

7. The apparatus of claim 1 wherein said electrical resistance heater assembly includes:

a first electrical resistance portion which is housed by said flexible sheet housing assembly, and a second electrical resistance portion which is housed by said wind breaker assembly.

\* \* \* \* \*